United States Patent [19]

Poola et al.

[11] Patent Number: 5,636,619
[45] Date of Patent: Jun. 10, 1997

[54] METHOD AND APPARATUS FOR REDUCING COLD-PHASE EMISSIONS BY UTILIZING OXYGEN-ENRICHED INTAKE AIR

[75] Inventors: Ramesh B. Poola, Woodridge; Ramanujam R. Sekar, Naperville; Kevin C. Stork, Chicago, all of Ill.

[73] Assignee: The University of Chicago, Chicago, Ill.

[21] Appl. No.: 598,029

[22] Filed: Feb. 7, 1996

Related U.S. Application Data

[63] Continuation-in-part of Ser. No. 19,102, Feb. 18, 1993, Pat. No. 5,526,641.
[51] Int. Cl.$^6$ ............................................. F02B 23/00
[52] U.S. Cl. ............................................. 123/585
[58] Field of Search ............................. 123/585, 26, 567

[56] References Cited

U.S. PATENT DOCUMENTS

5,051,113 9/1991 Nemser ............................ 123/26
5,051,114 9/1991 Nemser et al. ..................... 55/16
5,400,746 3/1995 Susa et al. ........................ 123/585

*Primary Examiner*—Noah Kamen
*Attorney, Agent, or Firm*—Mason, Kolehmainen, Rathburn & Wyss

[57] ABSTRACT

An oxygen-enriched air intake control system for an internal combustion engine includes air directing apparatus to control the air flow into the intake of the engine. During normal operation of the engine, ambient air flowing from an air filter of the engine flows through the air directing apparatus into the intake of the engine. In order to decrease the amount of carbon monoxide (CO) and hydrocarbon (HC) emissions that tend to be produced by the engine during a short period of time after the engine is started, the air directing apparatus diverts for a short period of time following the start up of the engine at least a portion of the ambient air from the air filter through a secondary path. The secondary path includes a selectively permeable membrane through which the diverted portion of the ambient air flows. The selectively permeable membrane separates nitrogen and oxygen from the diverted air so that oxygen enriched air containing from about 23% to 25% oxygen by volume is supplied to the intake of the engine.

22 Claims, 6 Drawing Sheets

METHOD AND APPARATUS FOR REDUCING COLD-PHASE EMISSIONS BY UTILIZING OXYGEN-ENRICHED INTAKE AIR

CROSS REFERENCE TO RELATED APPLICATION

This application is a continuation-in-part application of U.S. patent application Ser. No. 08/019,102 filed on Feb. 18, 1993, now U.S. Pat. No. 5,526,641, and is assigned to the same assignee as the assignee of this application.

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

This invention relates to a method and apparatus for reducing carbon monoxide (CO) and hydrocarbon (HC) emissions in the exhaust of an internal combustion engine, and more particularly, to a new and improved method and apparatus for introducing oxygen enriched air into the intake of an internal combustion engine during at the least the initial start-up and warming-up periods of the engine after the engine is started.

2. Background of the Invention

A significant portion of the total pollutants emitted by light-duty passenger vehicles occurs immediately following the start-up of the engine. During this period, the engine block and exhaust manifold are cold, and the catalytic converter has not yet reached high conversion efficiencies (generally the catalyst is not fully effective at temperatures below about 250° C. for CO and 250° C. to 340° C. for HC emissions conversion). Moreover, it is a common practice to operate spark ignition engines with richer fuel-air mixtures during initial start-up and warming-up periods for proper operating driveability and acceleration. As a result, more unburned and partially burned hydrocarbons and more carbon monoxide are present in the exhaust after the engine is started and within the first 20 seconds of idling. On the other hand, the nitrogen oxides ($NO_x$) emissions in the exhaust tend to be low during this start-up period, but increase significantly when the vehicle is first accelerated. Consequently, the characteristics of the emissions in the exhaust of a spark ignition engine are influenced by both the engine operating conditions and the heating characteristics of the catalytic converter.

In order to meet the California Air Resources Board (CARB) Transitional Low Emission Vehicle (TLEV), Low Emission Vehicle (LEV) and Ultra Low Emission Vehicle (ULEV) standards, substantial reductions are required for HC and CO emissions from a spark ignition engine during the cold phase of the federal test procedure cycle. Similarly, many light-duty passenger cars are required to reduce these emissions to comply with Tier-II (year 2004) standards. This growing concern over start-up/cold-phase emissions has led to various attempts to develop new emissions treatment techniques that reduce the HC and CO levels in the exhaust emissions.

The attempts to reduce cold-phase (i.e., the first 505 seconds of federal test procedure driving cycle, as specified in the Code of Federal Regulations, Title 40, Part 86, Subpart 8, revised 1993) emissions by after-treatment methods can be grouped into three broad categories: (1) thermal management of the catalytic converter, including low-mass manifolds, double-walled exhaust pipes, electrically heated catalysts, exhaust-gas burners, exhaust-gas igniters, and insulated converters (with vacuum or refractory material); (2) placement of the converter closer to the exhaust manifold; and (3) management of the interaction between the hydrocarbons and the catalyst, using hydrocarbon adsorbent or traps in the exhaust. However, durability, fuel penalty, additional capital costs, unwanted heat in the engine compartment, and the complexity of these systems limit their application in vehicles.

On the other hand, a potentially attractive alternative is to control the emissions at the source itself (i.e., during combustion). One type of in-cylinder emission control is to introduce oxygen enriched air instead of ambient air to the air intake of the engine. Use of such oxygen enriched air can potentially reduce CO and HC emissions from a spark ignition engine, even during start-up and warming up periods because oxygen enrichment of the intake air reduces the emissions from the engine rapidly (even when the engine is cold). As a result, it helps to minimize the converter limitations during the cold phase and should improve converter efficiency. This method has the advantage of fewer add-on components, of lesser mechanical complexities, of not altering the fuel economy of the engine, and of an easier to modify system (the air intake system is easier to modify than the exhaust system).

Even though the oxygen-enrichment of the intake air in spark ignition engine powered vehicles results in the lowering of cold-phase HC and CO emissions in the exhaust of the vehicle, it tends to result in an increase in $NO_x$ in the exhaust. To some extent, the increase in $NO_x$ in the emissions has been offset by newer $NO_x$ control technologies that can remove nitrogen oxides from the emissions. These technologies include lean $NO_x$ catalysts and the injection into the exhaust gases of monatomic nitrogen induced by a pulse arc (see, for example, U.S. patent application Ser. No. 08/019,102, filed on Feb. 18, 1993 and assigned to the same assignee of record as the present application). The lack of an economical source of on-line oxygen equipment has made it difficult to provide a practical application of this concept. Recent developments of relatively compact oxygen-enrichment devices, such as selectively permeable membranes, has made oxygen-enrichment potentially practical. Nevertheless, it is necessary to have a simple, compact mechanical system driven by the engine itself that will economically extract oxygen from the air before an oxygen-enriched air intake system can practically be used on a vehicle.

Accordingly, it is an object of the present invention to provide a new and improved method and apparatus for reducing HC and CO emissions in the exhaust of a spark ignition internal combustion engine by introducing oxygen-enriched air into the air intake of a spark ignition engine vehicle during a short period of time following the start-up of the engine.

It is another object of the present invention to provide a new and improved method and apparatus for introducing oxygen-enriched air into the air intake of a spark ignition engine vehicle by diverting the intake air through a selectively permeable membrane for a predetermined time period so that oxygen enriched air is supplied to the engine intake manifold at least during a short period of time following the start-up of the engine.

It is yet another object of the present invention to provide a new and improved method and apparatus for introducing oxygen-enriched air into the air intake of a spark ignition engine vehicle by diverting the intake air through a selectively permeable membrane for a predetermined time period so that oxygen enriched air is supplied to an air plenum and from the air plenum into the engine intake manifold at least during a short period of time following the start-up of the engine.

SUMMARY OF THE INVENTION

In accordance with these and many other objects of the present invention, an oxygen-enriched air intake system for a spark ignition internal combustion engine embodying the present invention includes an air supply control system that enables oxygen-enriched air to be utilized as the intake of the engine after ambient air is processed in a selectively permeable membrane device. The flow of air from the air intake filter of the engine is controlled by an air intake bypass valve that is provided in the intake air flow path downstream of the air filter. During normal operation of the spark ignition engine, ambient or atmospheric air from the air filter flows directly through the closed air intake bypass valve and a closed engine intake bypass valve into an intake manifold of the engine.

In order to decrease the amount of carbon monoxide (CO) and hydrocarbon (HC) emissions that tend to be produced by the engine during a short period of time after the engine is started, both the air intake and engine intake bypass valves are open so that the intake manifold is supplied with oxygen-enriched air for that short period of time. With the air intake bypass valve open, ambient air from the air filter is diverted to flow through a secondary path that includes a selectively permeable membrane device. The ambient air being diverted through the secondary path is drawn through the permeable membrane device due to the vacuum being produced at the intake manifold of the engine. As the air flows through the permeable membrane device, a predetermined amount of nitrogen is separated from the air so that the air flowing from the membrane device contains from about 23% to 25% oxygen. As a result, oxygen enriched air is supplied through the open engine intake bypass valve into the engine intake manifold.

After a specified time period (for example, a few minutes) of engine operation following the start-up of the engine, both the air intake bypass valve and the engine intake bypass valve are closed so that air from the air intake filter is not diverted through the secondary air path. As a result, ambient air flows directly from the air filter through the closed air intake and engine intake bypass valves to the engine intake manifold.

The air intake and engine intake bypass valves preferably are set to normally be closed so that ambient air from the air intake filter flows directly to the engine intake manifold. These bypass valves will be activated electronically to close for a desired period of time as the engine is started to divert ambient air from the air intake filter through the permeable membrane device to the engine intake manifold.

In one alternate embodiment of the present invention, a compressor is disposed in the secondary path upstream of the membrane device between the air intake bypass valve and the membrane device. The compressor is used to pressurize the diverted air to several atmospheres on the upstream side of the membrane device while the downstream side of the membrane device is maintained at atmospheric pressure. The resulting differential pressure enables the regulation of the degree of oxygen-enrichment by the membrane device. An air plenum can be used in this configuration between the membrane device and the engine intake manifold to regulate the flow of oxygen-enriched air into the intake of the engine and to provide a reservoir for the oxygen enriched air.

In another alternate embodiment of the present invention, the secondary path through which the ambient air is diverted when the air intake bypass valve is opened includes a blower on the upstream side of the membrane device and a vacuum pump and an air plenum on the downstream side of the membrane device. A differential pressure is produced across the membrane device due to the pressurizing by the blower of the ambient air being diverted through the secondary path to slightly above atmospheric pressure on the upstream side of the permeable membrane device and the vacuum being maintained by the vacuum pump on the other, downstream side of the permeable membrane device. As a result, the diverted air flows through the permeable membrane device and a predetermined amount of nitrogen is separated from the air so that the air flowing through the vacuum pump into the air plenum contains from about 23% to 25% oxygen. The reservoir of oxygen enriched air within the air plenum will be replenished as the oxygen enriched air is supplied from the air plenum through the open engine intake bypass valve into the engine intake manifold. Any oxygen-enriched air trapped in the air plenum and in the secondary air flow path when the bypass valves are closed will remain therein for utilization in the next startup operation of the engine. A pressure relief valve is provided in the air plenum to prevent the oxygen enriched air from becoming supercharged or over pressurized. In some instances, the blower is not necessary because the vacuum pump provides a sufficient differential pressure across the membrane device to draw the ambient air through the membrane device.

In still a further alternate embodiment of the present invention, the flow of air from the air intake filter of the engine is controlled by an air intake bypass valve that is provided in the intake air flow path downstream of the air filter. During normal operation of the spark ignition engine, ambient or atmospheric air from the air filter flows directly through the closed air intake bypass valve into an air plenum and then into an intake manifold of the engine.

During a short period of time after the engine is started, the air intake bypass valve is partially opened so that a portion (for example, approximately 20%) of ambient air from the air filter is diverted to flow through a secondary path that includes a blower on the upstream side of a membrane device and a vacuum pump on the downstream side of the membrane device between the membrane device and the air plenum. The ambient air being diverted through the secondary path is drawn through the permeable membrane device due to the differential pressure established across the membrane device by the blower and the vacuum pump. As the air flows through the permeable membrane device, a predetermined amount of nitrogen is separated from the air so that the air flowing from the membrane device contains, for example, about 30% oxygen. This oxygen enriched air flows into the air plenum where it is mixed with the ambient air flowing into the air plenum from the air intake valve. As a result, oxygen enriched air containing about 23%–25% by volume of oxygen is supplied from the air plenum into the engine intake manifold.

After a specified time period (for example, a few minutes) of engine operation following the start-up of the engine, the air intake bypass valve is closed so that no portion of the ambient air from the air intake filter is any longer diverted through the secondary air path. As a result, ambient air flows directly from the air filter through the closed air intake bypass valve and the air plenum into the engine intake manifold.

The blower or compressor for pressurizing the diverted ambient air and the vacuum pump for drawing the air through the permeable membrane device can be mechanically driven from the engine or electrically driven with power from the engine's electrical system (i.e., the alternator). Oxygen-enriched intake air also can be used continuously to boost the power output of an engine during normal conditions. In such a situation, a suitable $NO_x$ after-treatment device should be used to lower any $NO_x$ emissions in the exhaust of the engine.

BRIEF DESCRIPTION OF THE DRAWINGS

These and many other objects and advantages of the present invention will become readily apparent from consideration of the following detailed description of the embodiment of the invention shown in the accompanying drawing wherein.

DETAILED DESCRIPTION OF THE PREFERRED EMBODIMENT

Figure 1:
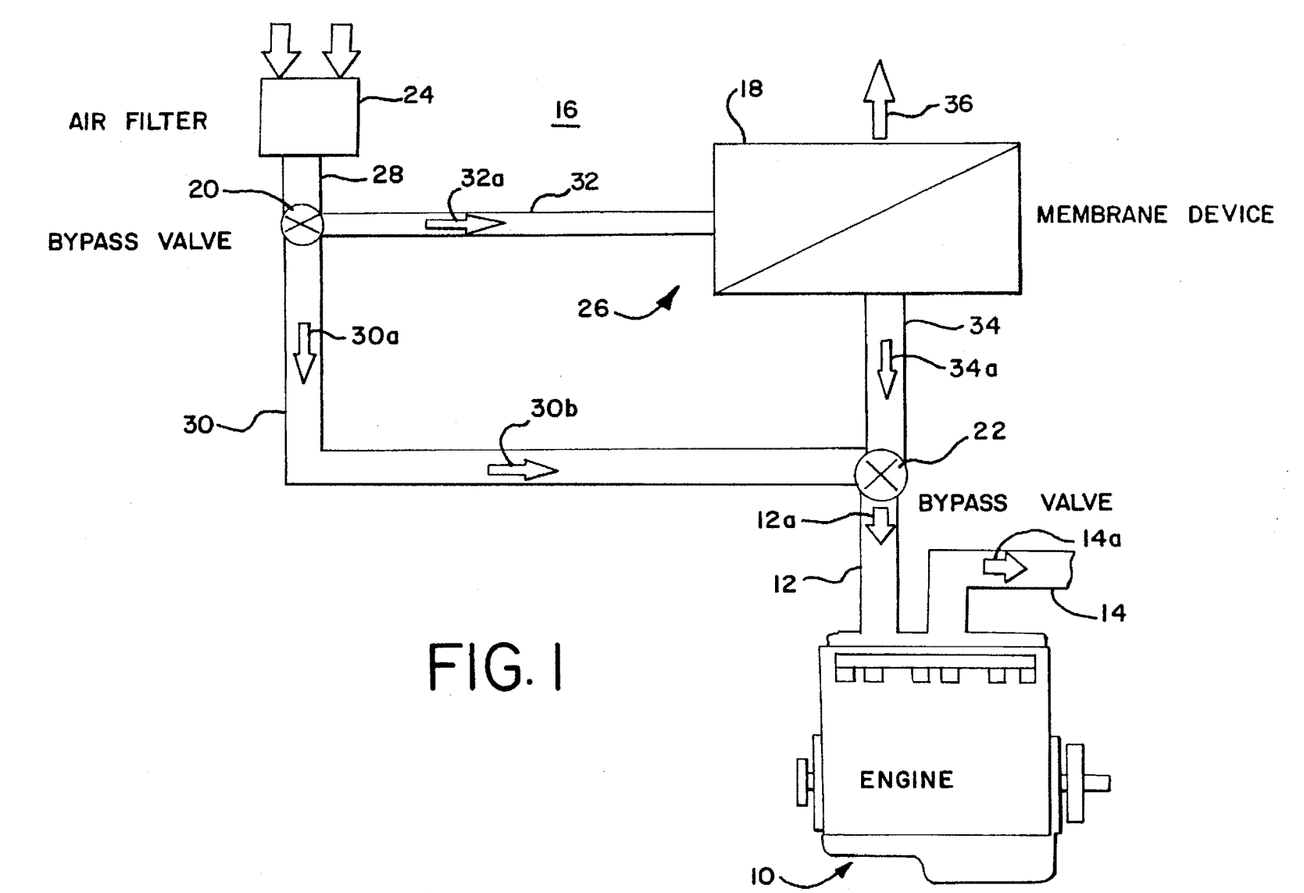
FIG. 1 is a diagrammatic illustration of an internal combustion engine with an air intake control system which supplies oxygen enriched air to the engine and which embodies the present invention.

Referring now more specifically to FIG. 1, therein is disclosed a diagrammatic representation of an internal combustion engine 10 having an intake line or duct 12 for receiving air that is to be combined with fuel in the engine 10 and an exhaust line or duct 14 through which is expelled exhaust gases produced by the engine 10. The exhaust gases contain a number of different pollutants including carbon monoxide (CO), hydrocarbon (HC), and oxides of nitrogen ($NO_x$). In order to limit the amount of CO and HC that is present in the exhaust gases expelled from the engine 10 through the exhaust line 14, particularly during the short period of time after the engine is started, the engine 10 is provided with an air supply control system that is generally designated by the reference numeral 16 and that embodies the present invention. The air supply control system 16 includes an oxygen enrichment or membrane device 18 that separates nitrogen from air so that oxygen enriched air is produced. In order to decrease the amount of CO and HC emissions in the exhaust line 14 that tend to be produced by the engine 10 during a period of time just after the engine 10 is started, both an air intake bypass valve or air directing device 20 and an engine intake bypass valve or air directing device 22 are opened so that ambient air from an air filter or inlet 24 is diverted to flow through a secondary path 26 that includes the membrane device 18. The ambient air is diverted from the air filter 24 through the secondary path 26. The portion of the diverted ambient air that becomes oxygen-enriched in the oxygen enrichment device 18 is supplied through the open engine intake bypass valve 22 and through the engine intake line 12 into the engine 10.

After a specified time period (for example, two to three minutes) of engine operation following the start-up of the engine 10, both the air intake bypass valve 20 and the engine intake bypass valve 22 are closed so that air from the air intake filter 24 is no longer diverted through the secondary air path 26. As a result, ambient air flows directly from the air filter 24 through the closed air intake bypass valve 20 and the engine intake bypass valve 22 to the air intake line 12 of the engine.

As previously indicated, ambient air flows directly from the air filter 24 through an air duct 28 to the air intake bypass valve 20. The air intake bypass valve 20 is normally closed so that the ambient air from the air filter 24 flows past the closed air intake bypass valve 20 and through an air duct 30 (as indicated by arrows 30a and 30b) to the engine intake bypass valve 22. The engine intake bypass valve 22 also remains closed during normal operations of the engine 10. Consequently, ambient air flows through the engine intake bypass valve 22 and the intake line 12 (as indicated by the arrow 12a) into the intake manifold of the engine 10 so that it can be combined with a combustible fuel.

The engine 10 may be any type of internal combustion engine in which air supplied through the intake line 12 is combined with a combustible fuel. As is the case with all such internal combustion engines, exhaust gases are produced that are expelled through the exhaust line 14 (as indicated by an arrow 14a). These exhaust gases typically will include pollutants such as carbon monoxide (CO), hydrocarbon (HC), and oxides of nitrogen ($NO_x$). The carbon monoxide (CO) and hydrocarbon (HC) are particularly prevalent in the emissions being expelled through the exhaust line 14 during the first few minutes of operation of the engine 10 after it is started. This is due in part to the fact that the engine block and exhaust manifold of the engine 10 are cold and the emissions are not efficiently converted by the catalytic converter that can be used with the engine 10 when it has not reached a sufficient elevated temperature. Moreover, it is a common practice to operate spark ignition engines, like the engine 10, with richer fuel-air mixtures during initial start-up and warming-up periods for proper operating driveability and acceleration. However, the rich fuel mixture tends to result in an increase in the carbon monoxide (CO) and hydrocarbon (HC) in the emissions being expelled through the exhaust line 14. In order to limit the amount of such pollutants in those emissions, oxygen enriched air is supplied through the air intake line 12 to the engine 10.

The air intake bypass valve 20 and the engine intake bypass valve 22 preferably are set to normally be closed so that ambient air from the air intake filter 24 flows directly to the engine 10 through the air lines 28, 30 and 12 as indicated by the arrows 30a, 30b and 12a. As the engine 10 is started, both the air intake bypass valve 20 and the engine intake bypass valve 22 will be activated electronically to open for a desired period of time. When the air intake bypass valve 20 is opened, air flowing in the duct 28 will be diverted into the secondary path 26 so as to flow into an air duct or input line 32 (as indicated by an arrow 32a) toward the membrane device 18. The diverted ambient air will flow in the air duct 32 due to the vacuum being produced at the engine intake manifold through an outlet line 34, the open engine bypass valve 22 and the intake line 12 so that the diverted air is drawn through the oxygen enrichment device 18. In this vacuum mode of operation, the vacuum maintained at the outlet line 34 on the downstream side of the membrane device 18 causes the oxygen to permeate from the higher pressure, upstream side of the membrane device 18 at the inlet line 32 to the lower pressure, downstream side of the membrane device 18 at the outlet line 34. This vacuum mode is typically energy efficient primarily because a vacuum is only applied to the downstream side of the membrane device 18 and requires no additional components to affect the flow of the diverted air through the membrane device 18.

The oxygen enrichment device 18 is adapted to separate oxygen and nitrogen present in the air being supplied through the input line 32 so as to produce oxygen enriched air (permeate) at the outlet line 34 and nitrogen enriched air (retentate) at another outlet line 36. The oxygen enrichment device 18 can be of the type having a selectively permeable membrane that can separate or enrich gaseous mixtures. An example of such a membrane is disclosed in U.S. Pat. Nos. 5,051,113 and 5,051,114 issued on Sep. 24, 1991. As indicated in those patents, such a membrane can be used to produce oxygen enriched air by separating oxygen and nitrogen present in the air.

Figure 6:
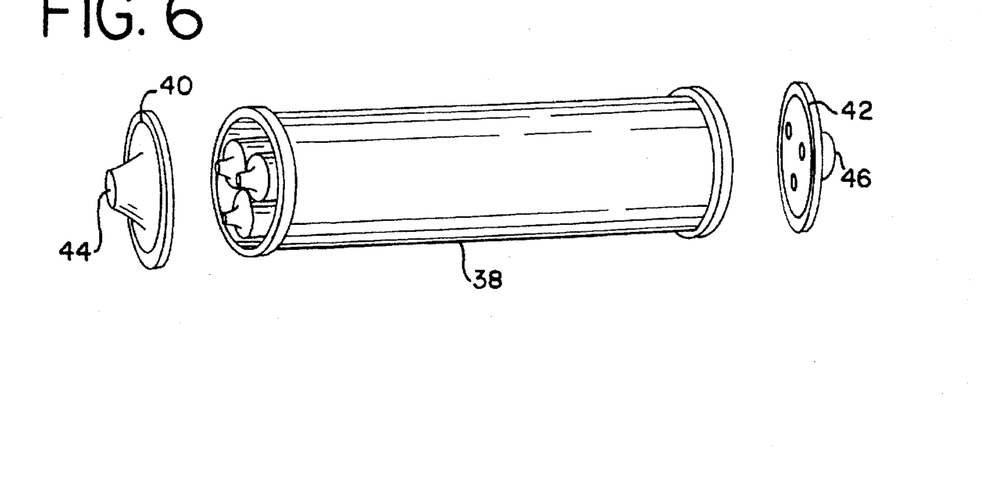
FIG. 6 is a partially exploded perspective view of an oxygen-enrichment device that can be used in the air intake control systems of FIGS. 1-5.

One configuration of such an oxygen enrichment device 18 is illustrated in FIGS. 6 and 7A–7C. As shown in FIG. 6, the oxygen enrichment device 18 may be in the form of cylindrical outer housing 38 with opposed end caps 40 and 42 closing the ends of the housing 38 and providing respectively, an input 44 to be connected to the input line 32 and an output 46 to be connected to the output line 34.

Figure 7A:
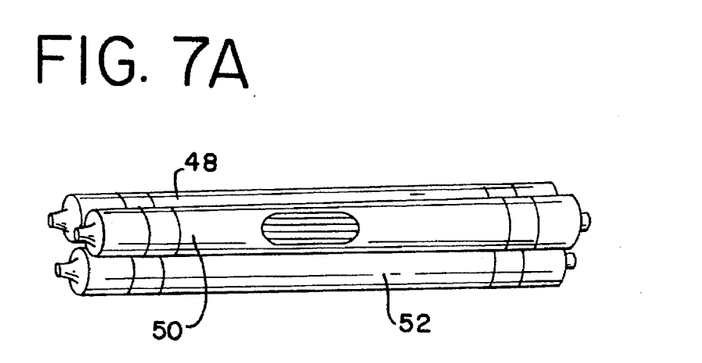
FIGS. 7A-7C are illustrations of components from the oxygen-enrichment device of FIG. 6.
Figure 7B:
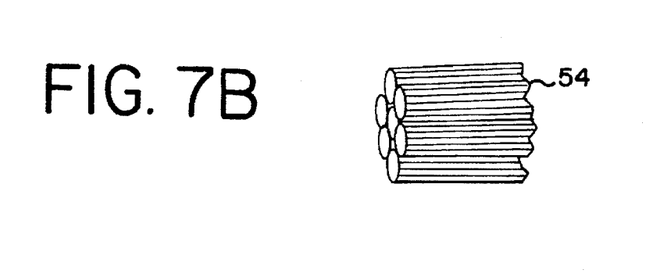
Figure 7C:
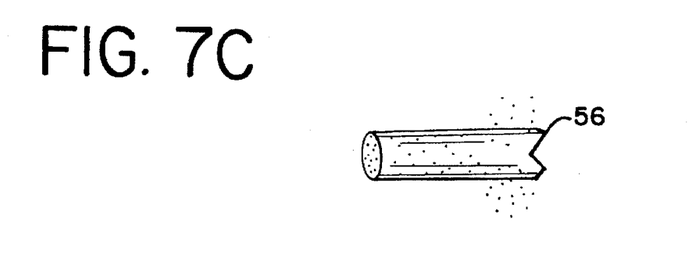

As illustrated in FIGS. 6 and 7A, three cartridges 48, 50, and 52 are disposed within the housing 38. Each of the cartridges 48, 50, and 52 contain fiber bundles, such as bundle 54 illustrated in FIG. 7B. The fiber bundles 54 can be formed of hollow polymer fibers in an asymmetric structure (a hollow fiber 56 is illustrated in FIG. 7C).

The capability of the oxygen enrichment device 18 (in terms of throughput capacity and ability to separate the components in the ambient air flowing through the oxygen enrichment device 18 from the input 44 to the output 46) is determined in part by the properties of the membrane material coated (inside or outside) on the hollow fibers 56 (permeability and selectivity) and by the operating conditions of temperature, differential pressure across the oxygen enrichment device 18 and the percent recovery. The size of the housing 38 of the oxygen enrichment device 18 depends on the skin thickness of the coating, the arrangement of the fibers 56 for best packing density and geometry, and the mode of operation (vacuum, pressure or a combination of both across the oxygen enrichment device 18). Due to the fact that the air flow control system 16 needs to be mounted in the engine compartment of an automobile, the size of the housing 38 is a significant limiting design criteria for the air flow control system 16 for automotive engine applications. While membrane material can be made of rubbery polymers (silicon rubber) or glassy polymers (ethyl cellulose and polysulfone), perfluorodioxole membrane material of the type disclosed in U.S. Pat. No. 5,051,114 possibly is more suitable for the hollow fibers 56 particularly in automobile applications.

The particular percentage of oxygen contained within the air flowing out from the oxygen enrichment device 18 through the air duct 34 into the intake line 12 of the engine 10 can be adjusted by providing the proper oxygen enrichment device 18. In this regard, the membrane surface area and the pressure differential across the membrane device 18 will in part determine the amount of nitrogen separated from the ambient air and thereby the percentage of oxygen within the air flowing into the engine 10. While the particular percentage of oxygen within the air flowing into the engine 10 can be varied depending on the performance requirements of the engine 10, typically the air should have about 21%–25% oxygen by volume and preferably, about 23%–25% oxygen by volume. With such a percentage of oxygen, the oxygen enriched air that is supplied to the air intake line 12 of the engine 10 during the first few minutes after the engine 10 is started will tend to minimize the amount of HC and CO in the exhaust emissions flowing out from the engine 10 in the exhaust line 14 during this start-up period of time.

The vacuum mode of air control system 16 disclosed in FIG. 1 has the economic advantage of not requiring auxiliary components that might otherwise require additional power and space to draw the air through the membrane device 18. However, the air control system 16 of FIG. 1 does not ensure constant oxygen-enriched air flowing to the air intake line 12 of the engine 10 in part because the differential pressure across the membrane device 18 that affects the oxygen concentration in the permeate flowing from the membrane device 18 varies with the vacuum developed in the intake manifold of the engine 10. In some applications, the vacuum developed at the intake manifold of the engine 10 is not sufficient to ensure a desired concentration of oxygen enriched air at the intake of the engine 10 irrespective of the engine intake manifold vacuum conditions. Air supply control systems 70 and 72 operating in a vacuum mode that do provide such a desired concentration of oxygen enriched air are disclosed in FIGS. 2–3 and embody the present invention.

Figure 2:
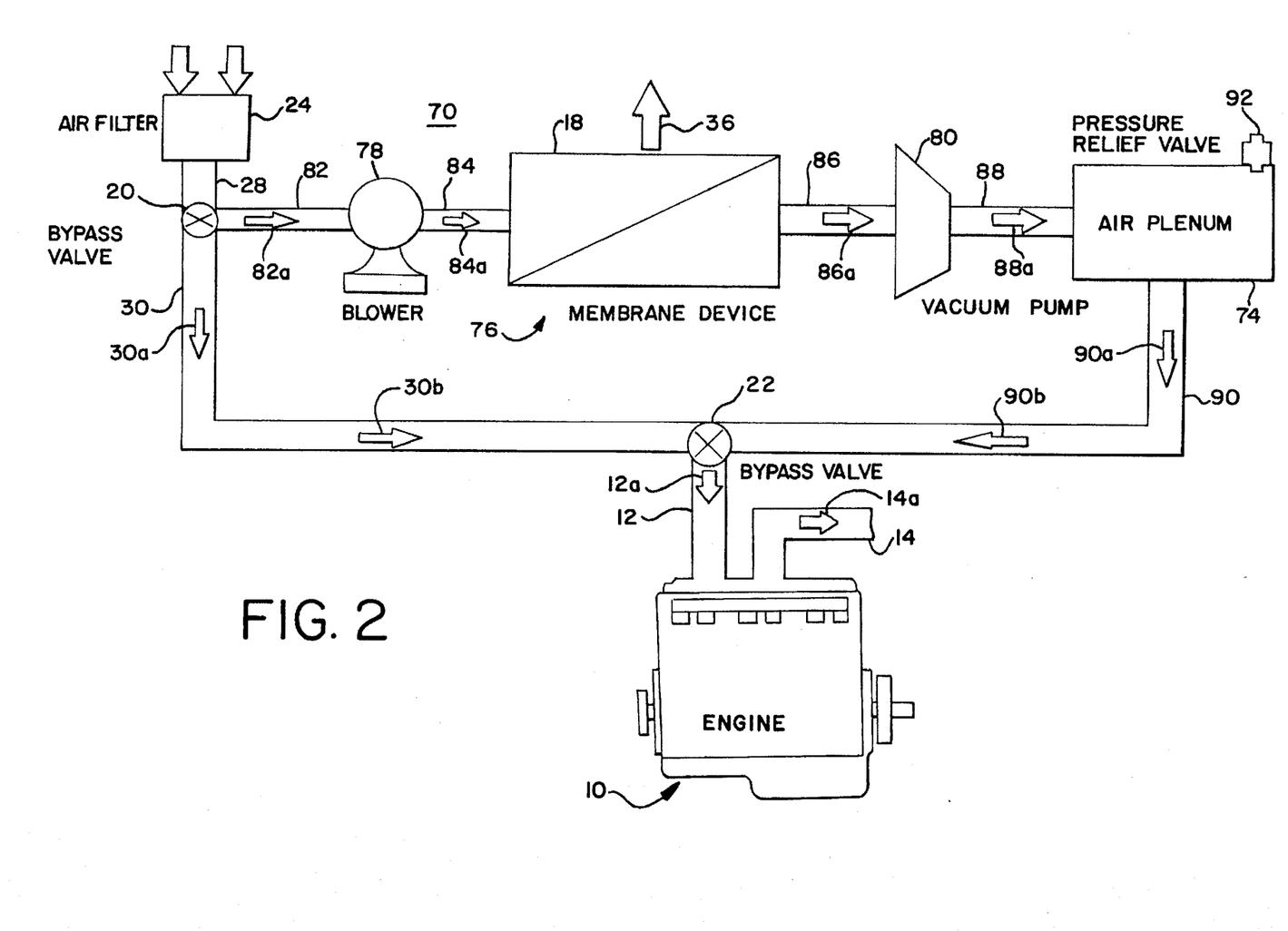
FIG. 2 is a diagrammatic illustration of an internal combustion engine with an alternate embodiment of air intake control system which supplies oxygen enriched air to the engine and which embodies the present invention.

The air supply control system 70 is illustrated diagrammatically in FIG. 2 and includes some of the same components as the air supply control system 16. The components of the air supply control system 70 which are essentially the same as corresponding components in the air supply control system 16 are referenced by the same reference numerals. The air supply control system 70 is used with the internal combustion engine 10 that has the intake line or duct 12 for receiving air (as indicated by the arrow 12a) that is combined with fuel in the engine 10 and the exhaust line or duct 14 through which is expelled (as indicated by the arrow 14a) exhaust gases produced by the engine 10. During normal operation of the engine 10, both the air intake bypass valve 20 and the engine intake bypass valve 22 are closed so that ambient air from the air intake filter 24 flows directly from the air filter 24 through the closed air intake bypass valve 20, through the air duct 30 (as indicated by the arrows 30a and 30b), and through the closed engine intake bypass valve 22 to the air intake line 12 of the engine 10.

In order to decrease the amount of carbon monoxide (CO) and hydrocarbon (HC) emissions in the exhaust line 14 that tend to be produced by the engine 10 during a period of time just after the engine 10 is started, both the air intake bypass valve 20 and the engine intake bypass valve 22 are opened so that ambient air from the air filter 24 is diverted to flow to an air plenum 74 through a secondary path 76 that includes a blower 78, the membrane device 18 and a vacuum pump 80. For the first few seconds at the beginning of operation of the engine 10 after it is started, the engine 10 draws through the open engine intake bypass valve 22 oxygen-enriched air that has been stored in the air plenum 74 from a previous operation of the engine 10. The ambient air is diverted through the secondary path 76. The portion of the diverted ambient air that becomes oxygen-enriched in the oxygen enrichment device 18 is supplied to the air plenum 74. This air contains from about 23% to 25% oxygen. As a result, the reservoir of oxygen enriched air within the air plenum 74 will be replenished as the oxygen enriched air flows from the air plenum 74 through the open engine intake bypass valve 22 and through the engine intake line 12 into the engine 10.

The air intake bypass valve 20 and the engine intake bypass valve 22 preferably are set to normally be closed so that ambient air from the air intake filter 24 flows directly to the engine 10 through the air lines 28, 30 and 12 as indicated by the arrows 30a, 30b and 12a. As the engine 10 is started, both the air intake bypass valve 20 and the engine intake bypass valve 22 will be activated electronically to open for a desired period of time. When the air intake bypass valve 20 is opened, air flowing in the duct 28 will be diverted into the secondary path 76 so as to flow into an air duct 82 (as indicated by an arrow 82a) toward the blower 78. The blower 78 and the vacuum pump 80 can be mechanically driven from the engine 10 or electrically driven with power from the electrical system (i.e., the alternator) of the engine 10. In either case, the blower 78 and the vacuum pump 80 establishes a pressure differential across the membrane device 18 so the diverted ambient air flowing in the air duct 82 is drawn to the oxygen enrichment device 18 through an input line 84 (as indicated by an arrow 84a).

The membrane device 18 can be of the type disclosed in FIGS. 6 of the drawings in which case the input line 84 is connected to the input 44 and the output 46 is connected to an output line 86. The oxygen enriched air (permeate) flows from the output 46 of the oxygen enrichment device 18 through the output line 86 (as indicated by an arrow 86a), the vacuum pump 80, and an air duct 88 (as indicated by an arrow 88a) into the air plenum 74. The air plenum 74 provides a reservoir chamber for the oxygen enriched air flowing from the oxygen enrichment device 18. As long as the air intake bypass valve 20 and the engine intake bypass valve 22 remain open, the air being diverted through the secondary path 76 will be oxygen enriched, accumulate in the air plenum 74 and flow out of the air plenum 74 along an air duct 90 (as indicated by arrows 90a and 90b), through the open engine intake bypass valve 22, and through the air intake line 12 into the engine 10. As a result, the air plenum 74 regulates the oxygen-enriched (permeate) air supply into the engine 10. In order to ensure that the air within the air plenum 74 does not become over pressurized or supercharged, a pressure relief valve 92 is used with the air plenum 74.

For the first few seconds at the beginning of operation of the engine 10, oxygen-enriched air will be supplied to the engine 10 from the air that has been stored in the plenum 74 from the previous operations of the engine 10. Thereafter, oxygen-enriched air will be continuously supplied to the air plenum 74 and thereby to the engine 10 as is described hereinabove. After a desired amount of time (for example, a few minutes of operation of the engine 10) after it is started, both the air intake bypass valve 20 and the engine intake bypass valve 22 will revert to their normally closed condition so that ambient air is no longer diverted to the secondary path 76 and the ambient air will flow directly from the air filter 24 to the engine intake line 12. The air trapped in the air plenum 74 as well as in the secondary path 76 will remain there for utilization during the next immediate operation of the engine 10.

Figure 3:
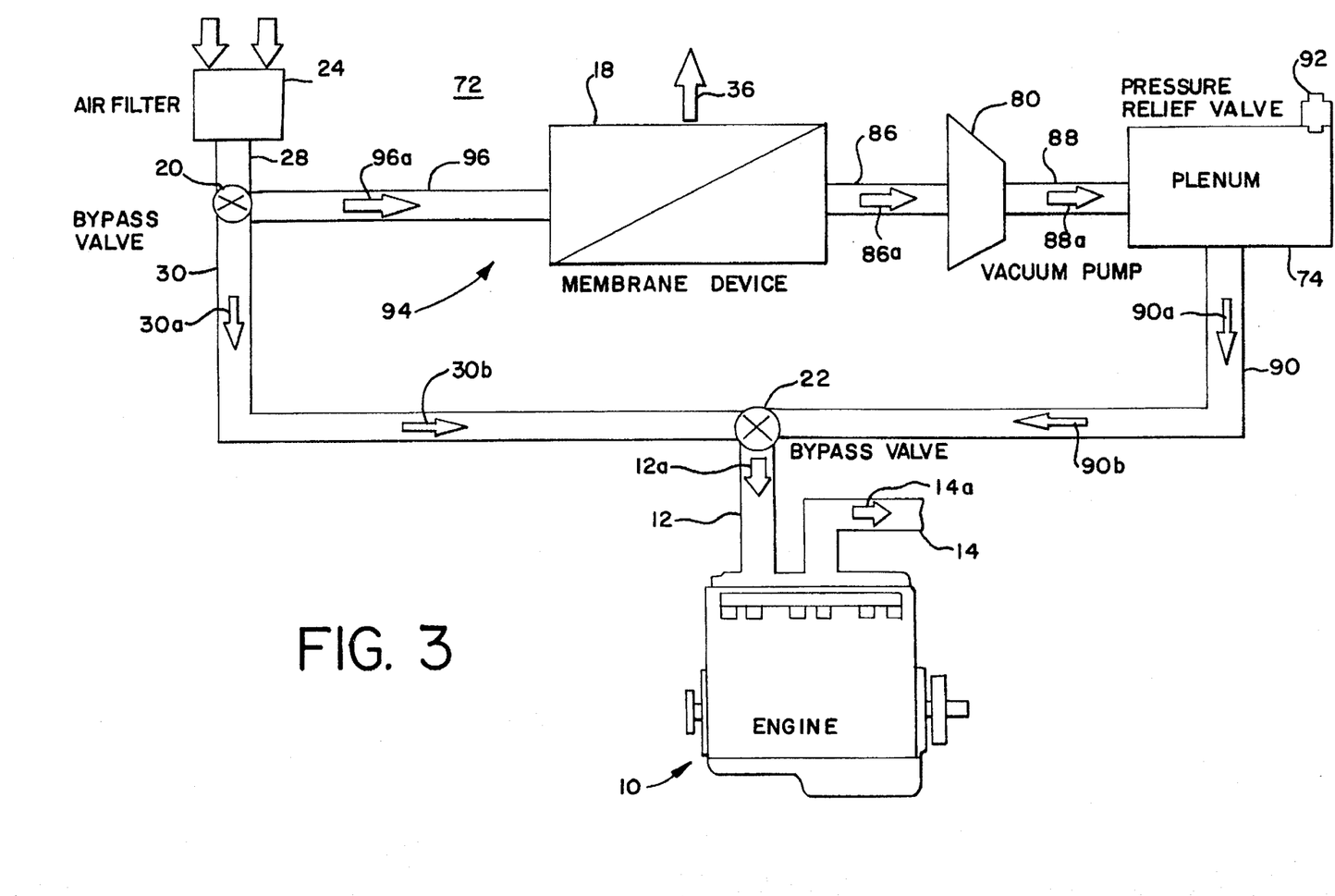
FIG. 3 is a diagrammatic illustration of an internal combustion engine with another alternate embodiment of air intake control system which supplies oxygen enriched air to the engine and which embodies the present invention.

FIG. 3 illustrates another air supply control system 72 for supplying oxygen-enriched air to the engine 10 utilizing a vacuum mode of operation. The air supply control system 72 illustrated diagrammatically in FIG. 3 includes essentially the same components as the air supply control system 70 of FIG. 2. Consequently, the components of the air supply control system 72 which are essentially the same as corresponding components in the air supply control system 70 are referenced by the same reference numerals. Basically the air supply control systems 70 and 72 operate in essentially the same way with the only significant difference being the elimination of the blower on the upstream side of the membrane device 18. The ambient air that is diverted into a secondary path 94 when the air intake bypass valve 20 is opened flows through an air inlet duct 96 (as indicated by an arrow 96a) directly into the membrane device 18 and more specifically the inlet 44 on the membrane device 18 illustrated in FIG. 6. As was the case with the air supply control system 70, vacuum is applied on the downstream, permeate side of the membrane device 18 through the outlet duct 86 by the vacuum pump 80. Without a blower on the upstream side of the membrane device 18, the differential pressure across the membrane device 18 from the inlet 44 to the outlet 46 is decreased as compared to the differential pressure established across the membrane device 18 in the air supply control system 70 disclosed in FIG. 2. This decrease in pressure differential can limit the amount of oxygen enriched air produced in the membrane device 18 and possibly affect the purging of the retentate out from the outlet 36 of the membrane device 18. While this pressure differential across the membrane device 18 might limit the effectiveness of the air supply control system 72 as compared to the air supply control system 70, the air supply control system 72 operates in the same way as does the air supply control system 70 with the added advantage of decreasing equipment cost and the power requirements by the elimination of the blower.

The air supply control systems 16, 70 and 72 illustrated in FIGS. 1-3 operate in a vacuum mode wherein the differential pressure across the membrane device 18 is established principally by a vacuum applied to the permeate or downstream side of the membrane device 18 at, for example, the outlet 46 of the membrane device 18 in FIG. 6. This vacuum mode is particularly suited to light-duty applications. In certain applications, a higher flow rate of air is required. In such instances, an air supply control system 100 illustrated in FIG. 4 can be used and is operated in a pressurized mode.

Figure 4:
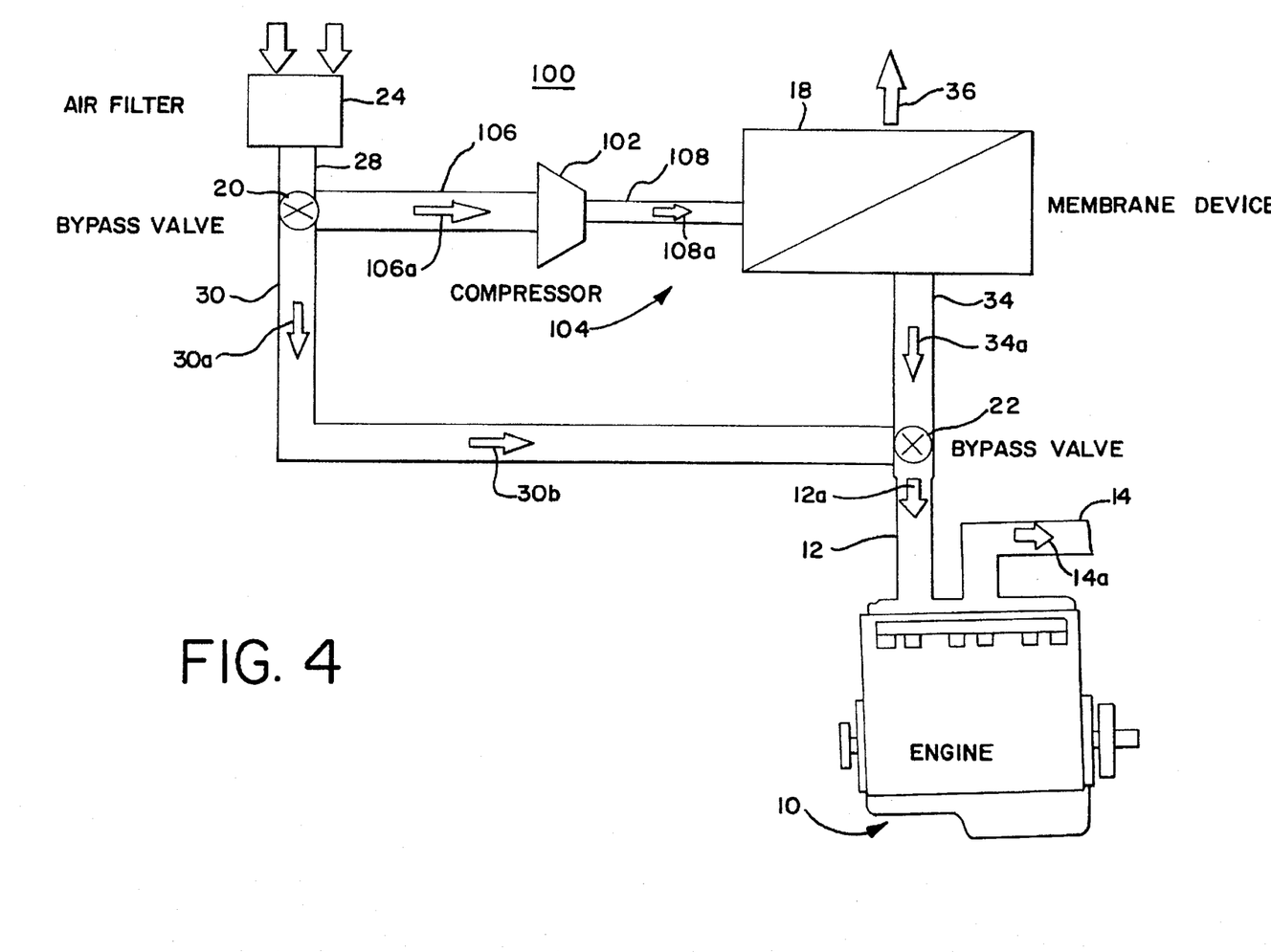
FIG. 4 is a diagrammatic illustration of an internal combustion engine with yet another alternate embodiment of an air intake control system which supplies oxygen enriched air to the engine and which embodies the present invention.

The air supply control system 100 illustrated diagrammatically in FIG. 4 is another embodiment of the present invention and includes essentially the same components as the air supply control system 16 of FIG. 1. Consequently, the components of the air supply control system 100 which are essentially the same as corresponding components in the air supply control system 16 are referenced by the same reference numerals. Basically air supply control system 100 operates in the same fashion as the air supply control system 16 with the only significant difference being the addition of a compressor 102 on the upstream side of the membrane device 18. The ambient air that is diverted into a secondary path 104 when the air intake bypass valve 20 is opened flows through an air duct 106 (as indicated by an arrow 106a) and is pressurized by the compressor 102 to typically several atmospheres (absolute). The pressurized diverted ambient air flows through an inlet duct 108 (as indicated by an arrow 108a) into the inlet 44 on the membrane device 18 illustrated in FIG. 6. As was the case with the air supply control system 16, oxygen-enriched air from the downstream, permeate side of the membrane device 18 flows through the outlet duct 34 (as indicated by the arrow 34a) into the intake manifold of the engine 10 through the open engine air bypass valve 22 and the intake duct 12. Higher forces driving the air through the membrane device 18 can be obtained by using the air supply control system 100 because a higher differential pressure can be established by the compressor 102 across the membrane device 18. This higher differential pressure results in the need for a lesser membrane area in the membrane device 18. On the other hand, the air supply control system 100 requires more energy to operate in view of the large volumes of air that have to be compressed to elevated pressures. While the air supply control system 100 illustrated in FIG. 4 does not include an air plenum to provide a reservoir for the oxygen-enriched air, an air plenum like the air plenum 74 used in the air control system 72 can be used between the membrane device 18 and the engine intake bypass valve 22 if the oxygen-enriched air flowing into the engine 10 needs to be further regulated.

Figure 5:
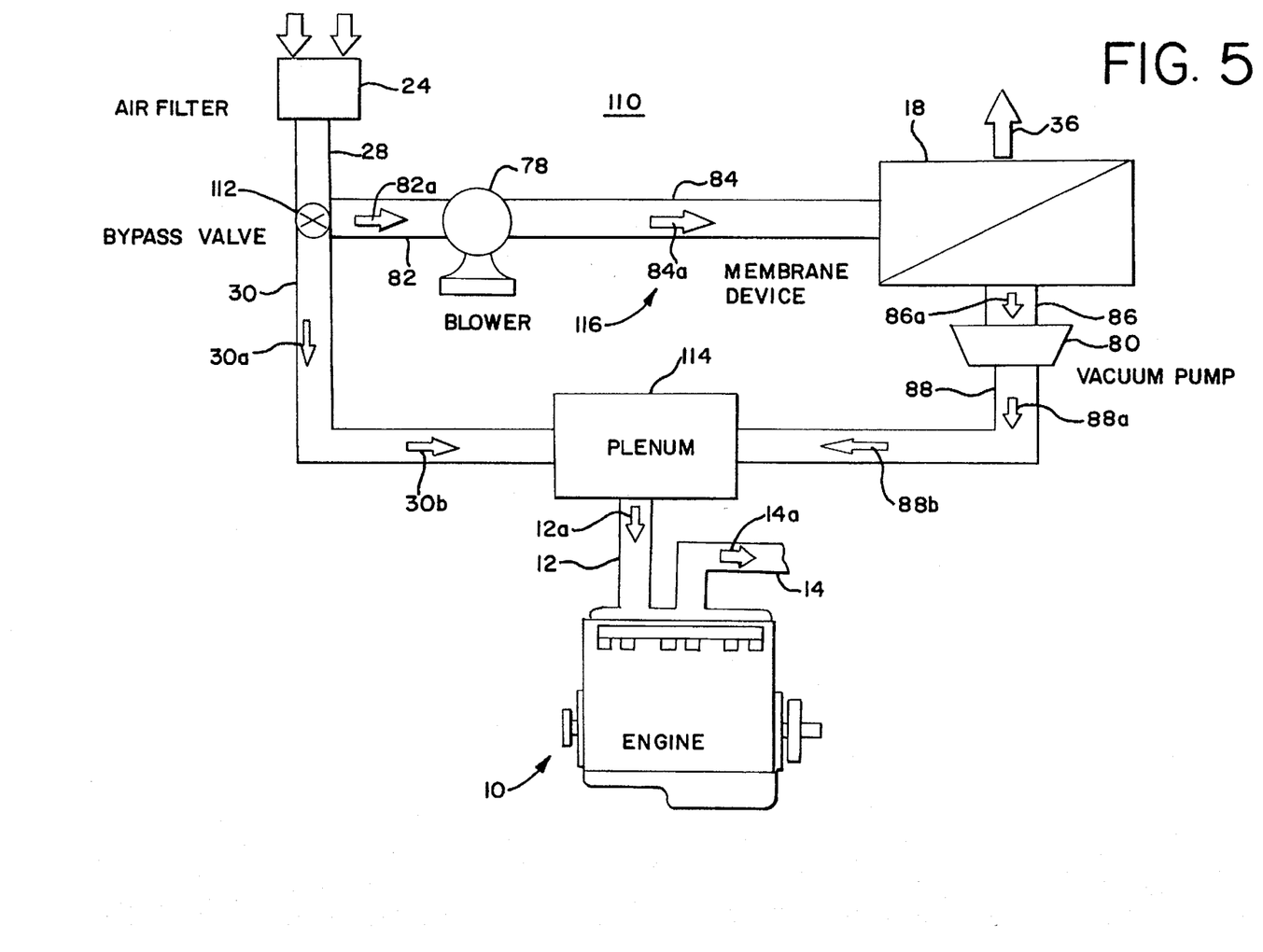
FIG. 5 is a diagrammatic illustration of an internal combustion engine with still another alternate embodiment of an air intake control system which supplies oxygen enriched air to the engine and which embodies the present invention.

Another air supply control system 110 embodying the present invention is disclosed in FIG. 5. This air supply control system 110 operates in a mixed mode (partially pressure and partially vacuum) and embodies the present invention. The air supply control system 110 includes essentially the same components as the air supply control system 70 of FIG. 2. Consequently, the components of the air supply control system 110 which are essentially the same as corresponding components in the air supply control system 70 are referenced by the same reference numerals. Basically the only difference between the air supply control systems 70 and 110 is the elimination of the engine intake bypass valve 22 used in the air supply control system 70. Instead of such a valve, ambient air flowing through an air intake bypass valve 112 and oxygen enriched air flowing from the membrane device 18 are mixed in an air plenum 114 so that air with the desired oxygen concentration can be supplied to the air intake line 12 of the engine 10.

The air supply control system 110 is used with the internal combustion engine 10 that has the intake line or duct 12 for receiving air (as indicated by the arrow 12a) that is combined with fuel in the engine 10 and the exhaust line or duct 14 through which is expelled (as indicated by the arrow 14a) exhaust gases produced by the engine 10. During normal operation of the engine 10, the air intake bypass valve 112 is closed so that ambient air from the air intake filter 24 flows directly from the air filter 24 through the closed air intake bypass valve 112, through the air duct 30 (as indicated by the arrows 30a and 30b), and through an air plenum 114 to the air intake line 12 of the engine 10.

In order to decrease the amount of carbon monoxide (CO) and hydrocarbon (HC) emissions in the exhaust line 14 that tend to be produced by the engine 10 during a period of time just after the engine 10 is started, the air intake bypass valve 112 is opened resulting in a portion of the ambient air from the air filter 24 being diverted to flow to through a secondary path 116. As an example, about 20% of the air flowing in the air duct 28 from the air filter 24 is directed into the secondary path 116 with the remaining approximately 80% of the air flowing from the air filter 24 continuing to flow through the air duct 30 to the air plenum 114. The secondary air path 116 includes the blower 78, the membrane device 18 and the vacuum pump 80. When the engine 10 is initially started, the engine 10 draws air from the air plenum 114 that is flowing through the air intake bypass valve 112 and through the air duct 30. After a few seconds, the portion of the ambient air that has been diverted through the secondary path 116 and therefore through the oxygen enrichment device 18 is supplied to the air plenum 114. This air contains about 30% oxygen by volume. When this oxygen enriched air is combined in the air plenum 114 with the ambient air flowing into the air plenum 114 from the air duct 30, the air within the air plenum 114 will be oxygen enriched with about 23%–25% oxygen by volume. This oxygen enriched air then flows through the engine intake line 12 into the engine 10.

The air intake bypass valve 112 preferably is set to normally be closed so that ambient air from the air intake filter 24 flows directly to the engine 10 through the air lines 28 and 30 (as indicated by the arrows 30a, 30b), the air plenum 114 and the air line 12 (as indicated by the arrow 12a). As the engine 10 is started, the air intake bypass valve 112 will be activated electronically to open for a desired period of time. When the air intake bypass valve 112 is opened, not all of the air flowing in the duct 28 is diverted into the secondary path 116. Instead, only about 20% of the air flowing in the air duct 28 will be diverted so as to flow into the air duct 82 (as indicated by an arrow 82a) toward the blower 78. The blower 78 and the vacuum pump 80 can be mechanically driven from the engine 10 or electrically driven with power from the electrical system (i.e., the alternator) of the engine 10. In either case, the blower 78 and the vacuum pump 80 establishes a pressure differential across the membrane device 18 so the diverted ambient air flowing in the air duct 82 is drawn to the oxygen enrichment device 18 through the input line 84 (as indicated by an arrow 84a).

The membrane device 18 can be of the type disclosed in FIGS. 6 of the drawings in which case the input line 84 is connected to the input 44 and the output 46 is connected to an output line 86. The oxygen enriched air (permeate) flows from the output 46 of the oxygen enrichment device 18 through the output line 86 (as indicated by an arrow 86a), the vacuum pump 80, and the air duct 88 (as indicated by an arrow 88a) into the air plenum 114. The air plenum 114 provides a reservoir chamber for the oxygen enriched air flowing from the oxygen enrichment device 18 and provides a mixing chamber for mixing of the oxygen enriched air form the secondary path 116 and the ambient air from the air duct 30. As long as the air intake bypass valve 112 remains open, the air being diverted through the secondary path 116 will be oxygen enriched, flow into the air plenum 114 where it is mixed with ambient air and flow out of the air plenum 114 through the air intake line 12 into the engine 10.

For the first few seconds at the beginning of operation of the engine 10, ambient air will be supplied to the engine 10 from the air that is flowing into the air plenum 114. Thereafter, oxygen-enriched air will be continuously supplied to the air plenum 114 and mixed with ambient air so that the mixed air (i.e., oxygen enriched air) will be supplied to the engine 10 as is described hereinabove. After a desired amount of time (for example, a few minutes of operation of the engine 10) after it is started, the air intake bypass valve 112 will revert to its normally closed condition so that no portion of the ambient air is any longer diverted to the secondary path 116 and the engine 10 will be supplied ambient air.

The use of the air supply control system 110 illustrated in FIG. 5 in a mixed mode of operation enables a higher differential pressure to be maintained across the membrane device 18. As a result, higher oxygen-enrichment levels can be obtained so that a lower volume of air needs to be treated by the membrane device 18. Nevertheless, the system 110 ensures that the engine 10 will be supplied with air even if any of the components in the secondary path 116 including in particularly, the membrane device 18, fails to deliver oxygen enriched air because ambient air is being supplied at all times to the air plenum 114. Even though higher differential pressures must be established across the membrane device 18 in the control 110. the power requirements are comparable to a vacuum mode of operation (for example, the control system 70) due to the fact that a lower level of air flow is needed across the membrane device 18.

Obviously, many modifications and variations of the present invention are possible in light of the above teachings. In this regard, the air intake valve 20 and the engine intake bypass valve 22 can be otherwise selectively opened other than for the short period of time after the engine 10 is initially started to boost the power output of the engine 10 by having oxygen enriched air supplied to the engine intake line 12. In such a situation, a suitable $NO_x$ after-treatment device should be used to lower any $NO_x$ emissions in the exhaust line 14 of the engine 10. Thus, it is to be understood that, within the scope of the appended claims, the invention may be practiced otherwise than as specifically described above.

What is claimed and desired to be secured by Letters Patent of the United States is:

1. An air control system for an internal combustion engine for supplying ambient air from an air inlet means and/or oxygen enriched air to an air intake of said engine so as to limit pollutants in exhaust gases emitted by said engine, said air control system comprising:

a first air flow means through which said ambient air is supplied to said air intake of said engine from said air inlet means;

a second air flow means having an oxygen enrichment means for producing oxygen enriched air from said ambient air; and air directing means associated with said first and second air flow means for controlling the flow of air in said first and second air flow means, said air directing means having at least one state wherein said ambient air flows in said first air flow means to said air intake of said engine and having at least a second state wherein at least a portion of said ambient air is diverted from said first air flow means to said second air flow means through said oxygen enrichment means and into an air plenum wherein oxygen enriched air from said oxygen enrichment means is stored and from which oxygen enriched air is supplied to said air intake of said engine when said air directing means is in said second state.

2. An air control system as set forth in claim 1 wherein said air plenum means receives said ambient air from said first air flow means and said oxygen enriched air from said second air flow means, said air plenum means supplying said ambient air to said air intake of said engine when said air directing means is in said one state and a mixture of said ambient air and said oxygen enriched air into said air intake of said engine when said air directing means is in said second state.

3. An air control system for an internal combustion engine for supplying ambient air from an air inlet means and/or oxygen enriched air to an air intake of said engine so as to limit pollutants in exhaust gases emitted by said engine, said air control system comprising:

a first air flow means through which said ambient air is supplied to said air intake of said engine from said air inlet means;

a second air flow means having an oxygen enrichment means for producing oxygen enriched air from said ambient air; and air directing means associated with said first and second air flow means for controlling the flow of air in said first and second air flow means, said air directing means including first and second bypass valves having a first mode wherein said ambient air flows in said first air flow means through said first bypass valve and said second bypass valve to said air intake of said engine and a second mode wherein said ambient air is diverted by said first bypass valve to flow through said second air flow means including said oxygen enrichment means so that oxygen enriched air is supplied through said second bypass valve into said air intake of said engine.

4. An air control system as set forth in claim 3 wherein first and second bypass valves are in said second mode for a predetermined period of time following the start-up of said engine.

5. An air control system as set forth in claim 3 wherein said oxygen enriched air from said oxygen enrichment means flows into an air plenum and oxygen enriched air is supplied to said air intake of said engine from said air plenum through said second bypass valve.

6. An air control system as set forth in claim 5 wherein said air plenum includes a pressure relief valve to limit the amount of air pressure within said air plenum.

7. An air control system as set forth in claim 3 wherein said oxygen enrichment means includes a selectively permeable membrane for separating nitrogen from ambient air so that oxygen enriched air is produced.

8. An air control system as set forth in claim 3 wherein said oxygen enrichment means includes hollow polymer fibers that separate nitrogen and oxygen from ambient air.

9. An air control system as set forth in claim 3 wherein said oxygen enrichment means produces oxygen enriched air containing about 23%–25% oxygen by volume.

10. An air control system as set forth in claim 3 including a vacuum means associated with said oxygen enrichment means in said second air flow means to establish a differential pressure across said oxygen enrichment means so that said ambient air flows through said oxygen enrichment means.

11. An air control system as set forth in claim 10 including a blower means associated with said oxygen enrichment means in said second air flow means to aid in establishing said differential pressure across said oxygen enrichment means.

12. An air control system as set forth in claim 3 including a compressor means associated with said oxygen enrichment means in said second air flow means to cause said ambient air to flow through said oxygen enrichment means.

13. An air control system for an internal combustion engine for supplying ambient air from an air inlet means and/or oxygen enriched air to an air intake of said engine so as to limit pollutants in exhaust gases emitted by said engine, said air control system comprising:

a first air flow means through which said ambient air is supplied to said air intake of said engine from said air inlet means;

a second air flow means having an oxygen enrichment means for producing oxygen enriched air from said ambient air, said oxygen enrichment means includes hollow polymer fibers that are in fiber bundles disposed in cartridges within an outer housing and that separate nitrogen and oxygen from ambient air.

14. An air control system as set forth in claim 13 wherein said hollow polymer fibers are formed of perfluorodioxole membrane material.

15. An air control system for an internal combustion engine for supplying ambient air from an air inlet means and/or oxygen enriched air to an air intake of said engine so as to limit pollutants in exhaust gases emitted by said engine, said air control system comprising:

a first air flow means through which said ambient air is supplied to said air intake of said engine from said air inlet means;

a second air flow means having an oxygen enrichment means for producing oxygen enriched air from said ambient air; and first and second air bypass means in said first and second air flow means for controlling the flow of air in said first and second air flow means, said first air bypass means having at least first and second states and said second air bypass means having at least first and second states with said ambient air flowing through said first air bypass means, said first air flow means and said second air bypass means to said air intake of said engine when said first and second air bypass means are in said first state and with at least a portion of said ambient air being diverted from said first air flow means to said second air flow means by said first air bypass means through said oxygen enrichment means and through said second air bypass means to said air intake of said engine when said first and second air bypass means are in said second state so as to provide said air intake of said engine with oxygen enriched air.

16. An air control system as set forth in claim 15 wherein said oxygen enrichment means includes hollow polymer fibers that separate nitrogen and oxygen from ambient air.

17. An air control system as set forth in claim 15 wherein said oxygen enrichment means produces oxygen enriched air containing about 23%-25% oxygen by volume.

18. An air control system as set forth in claim 15 including a vacuum means associated with said oxygen enrichment means in said second air flow means to establish a differential pressure across said oxygen enrichment means so that said ambient air flows through said oxygen enrichment means.

19. An air control system as set forth in claim 18 including a blower means associated with said oxygen enrichment means in said second air flow means to aid in establishing said differential pressure across said oxygen enrichment means.

20. An air control system as set forth in claim 15 including a compressor means associated with said oxygen enrichment means in said second air flow means to cause said ambient air to flow through said oxygen enrichment means.

21. An air control system for an internal combustion engine for supplying ambient air from an air inlet means and/or oxygen enriched air to an air intake of said engine so as to limit pollutants in exhaust gases emitted by said engine, said air control system comprising:

a first air flow means through which said ambient air is supplied to said air intake of said engine from said air inlet means;

a second air flow means having an oxygen enrichment means for producing oxygen enriched air from said ambient air;

an air plenum means in fluid communication with said first air flow means, said second air flow means and said air intake of said engine; and air bypass means in said first and second air flow means for controlling the flow of air in said first and second air flow means, said air bypass means having at least first and second states with said ambient air flowing through said first air bypass means, said first air flow means and said air plenum means to said air intake of said engine when said air bypass means is in said first state and with a portion of said ambient air being diverted from said first air flow means to said second air flow means by said air bypass means through said oxygen enrichment means so that oxygen enriched air is supplied to said air plenum means so as to be combined with said ambient air from said first air flow means whereby oxygen enriched air is supplied to said air intake of said engine from said air plenum means when said air bypass means is in said second state.

22. An air control system as set forth in claim 21 including a blower means and a vacuum means associated with said oxygen enrichment means in said second air flow means to establish a differential pressure across said oxygen enrichment means so that said ambient air flows through said oxygen enrichment means.

* * * * *